(12) United States Patent
Nakagawa et al.

(10) Patent No.: US 8,267,809 B2
(45) Date of Patent: Sep. 18, 2012

(54) MOLD FOR FORMING GOLF BALL, METHOD TO MANUFACTURE GOLF BALL WITH SAME, AND GOLF BALL MANUFACTURED USING THE SAME

(75) Inventors: Takuma Nakagawa, Chichibu (JP); Katsunori Sato, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 225 days.

(21) Appl. No.: 12/647,715

(22) Filed: Dec. 28, 2009

(65) Prior Publication Data

US 2011/0159988 A1   Jun. 30, 2011

(51) Int. Cl.
*B29C 70/70* (2006.01)
(52) U.S. Cl. ......... 473/378; 264/161; 264/162; 425/116
(58) Field of Classification Search ............... 425/116; 264/161, 162; 473/351, 378
See application file for complete search history.

(56) References Cited

U.S. PATENT DOCUMENTS

| | | | | |
|---|---|---|---|---|
| 5,554,337 A | * | 9/1996 | Ihara | 264/442 |
| 5,566,943 A | * | 10/1996 | Boehm | 473/378 |
| 5,906,551 A | * | 5/1999 | Kasashima et al. | 473/384 |
| 6,428,299 B1 | * | 8/2002 | Tanaka et al. | 425/116 |
| 6,981,927 B2 | * | 1/2006 | Aoyama | 473/378 |
| 7,201,862 B2 | * | 4/2007 | Endo et al. | 264/161 |
| 2009/0023520 A1 | * | 1/2009 | Ninomiya et al. | 473/383 |
| 2010/0316756 A1 | * | 12/2010 | Nakagawa et al. | 425/408 |
| 2010/0317464 A1 | * | 12/2010 | Nakagawa et al. | 473/378 |

FOREIGN PATENT DOCUMENTS

| | | | |
|---|---|---|---|
| JP | 60-142870 A | | 7/1985 |
| JP | 63158075 A | * | 7/1988 |
| JP | 11-114092 A | | 4/1999 |

* cited by examiner

*Primary Examiner* — Robert B Davis
(74) *Attorney, Agent, or Firm* — Sughrue Mion, PLLC (57) ABSTRACT

A golf ball that, in the process of spherical grinding after forming, can maintain the dimple shape and achieve the designed dimple surface occupation ratio. A mold for forming a golf ball of the present invention has at least two body parts, a cavity being formed within the mold by the joining of the at least two body parts, the body part comprising a cavity wall surface which has a spherical surface shape with the center thereof being at the center of the cavity and dimple-forming protrusions provided on the cavity wall surface, the dimple-forming protrusions being connected to the cavity wall surface at an angle of about 60 or more degrees in a region from about 3 μm to about 20 μm from the cavity wall surface.

11 Claims, 6 Drawing Sheets

MOLD FOR FORMING GOLF BALL, METHOD TO MANUFACTURE GOLF BALL WITH SAME, AND GOLF BALL MANUFACTURED USING THE SAME

FIELD OF THE INVENTION

The present invention relates to a mold for forming a golf ball, to a method for manufacturing a golf ball, and to a golf ball manufactured using this mold.

BACKGROUND OF THE INVENTION

As is widely known, a golf ball may be formed by using a forming mold that can be divided into two parts, the mold, having a spherical cavity therein, being formed with a large number of protrusions for forming dimples (dimple-forming protrusions) on the wall surface of the cavity, and having a parting line substantially at the position of the equator of the cavity.

In the case of using such a mold to obtain a golf ball that has a core covered by a cover layer formed by injection molding on the surface thereof, the core is disposed at the center of the two molds and is supported by a supporting pin, and the cover layer is formed by covering material by injection molding in the space between the inner surface of the mold and the core surface.

In this type of injection molding, after the covering material is injected and the golf ball is formed, when the supporting pin is pulled out, pin burrs occur on the surface of the golf ball. Additionally, the hardened cover material within the gate for injecting covering material (resin material) of the ball remains in a projecting state, forming protrusions, and in addition, and fine burrs are also produced at the parting line position of mold.

Because these burrs are a cause of greatly degraded aerodynamic characteristics of the golf ball, it is necessary to remove them by grinding after molding. However, in the grinding process to remove these burrs, the dimples are also ground, the size thereof being reduced, and this leads to a problem in that the surface area occupied by the dimples is reduced from the value at the time of design. Also, deformation of the dimples due to grinding is sensitive to the strength of grinding, so that there were variations between golf balls. The specification of the Japanese Patent Application Publication No. 60-142870 describes a method for maintaining the shape of the dimples while removing burrs, by making the area surrounding the dimples along the parting line have a specific shape. Also, Japanese Patent Application Publication No. 11-114092 describes a method of forming protrusions near the dimples on the equator to avoid abrasion of dimples due to grinding. Various methods have been proposed to avoid the abrasion of the dimples by grinding in the area adjacent to the parting line. However, in spherical grinding for the purpose of removing pin burrs, insufficient consideration has been given to maintaining the shape of dimples over the entire surface of the golf ball.

SUMMARY OF THE INVENTION

An object of the present invention is to provide a mold for forming a golf ball and a golf ball manufactured using that mold, in which, in the process of grinding the entire ball surface to remove pin burrs after molding, the size of the dimples is maintained and the designed surface occupation ratio thereof is achieved.

To achieve the above object, a mold for molding a golf ball according to the present invention has at least two body parts, a cavity being formed within the mold by the joining of the at least two body parts, wherein the body part comprises a cavity wall surface having a spherical surface shape with the center thereof being at the center of the cavity and dimple-forming protrusions provided on the cavity wall surface, the dimple-forming protrusions being connected to the cavity wall surface at an angle of about 60 or more degrees in a region from about 3 μm to about 20 μm from the cavity wall surface.

The angle may be made at least about 80 or more degrees, and may also be made perpendicular. The region may be made from about 6 μm to about 15 μm from the cavity wall surface. At least one of the body parts may further have a groove in the cavity wall surface adjacent to the whole circumference of a parting line formed by the joining, for the purpose of forming a protruding land part that will be ground after molding of the ball. The groove may have a depth from about 5 μm to about 100 μm from the cavity wall surface. The bottom surface of the groove and the cavity wall surface may be connected to each other asymptotically. The width of the groove may be within about 10 mm. The bottom surface of the groove may include a spherical surface part having a center that is the same as a center of the spherical surface shape of the cavity wall surface.

Another aspect of the present invention is a method for manufacturing a golf ball, this method including a step of forming a golf ball using the above-noted mold and a step of grinding a surface of the golf ball.

The golf ball formed by the above-noted mold may have an expected ground land part on a surface of the golf ball, wherein in the grinding step at least about 50% of the thickness of the expected ground land part is ground away.

Another aspect of the present invention provides a golf ball manufactured using the above-noted mold and having a surface that is ground.

The golf ball formed by the mold for forming a golf ball according to the present invention has a land part pre-formed in the grinding area that will be ground during the process of spherical grinding to remove pin burrs, and can maintain the size and shape of the dimples even after the spherical grinding process. Additionally, because a region that is expected to be ground away by this grinding is connected to the dimples at a certain angle, the influence of variation of grinding amount in the grinding process on the dimple size and shape can be made small, thereby enabling the maintenance of the amount of surface area occupied by the dimples.

Given the above, it is possible to expand the adjustment range of the symmetry performance of the dimples disposed on the surface of the golf ball, and it is also possible to improve the outer appearance of the golf ball.

DETAILED DESCRIPTION OF THE INVENTION

One embodiment of the present invention is described in detail below, with references made to the accompanying drawings.

Figure 1:
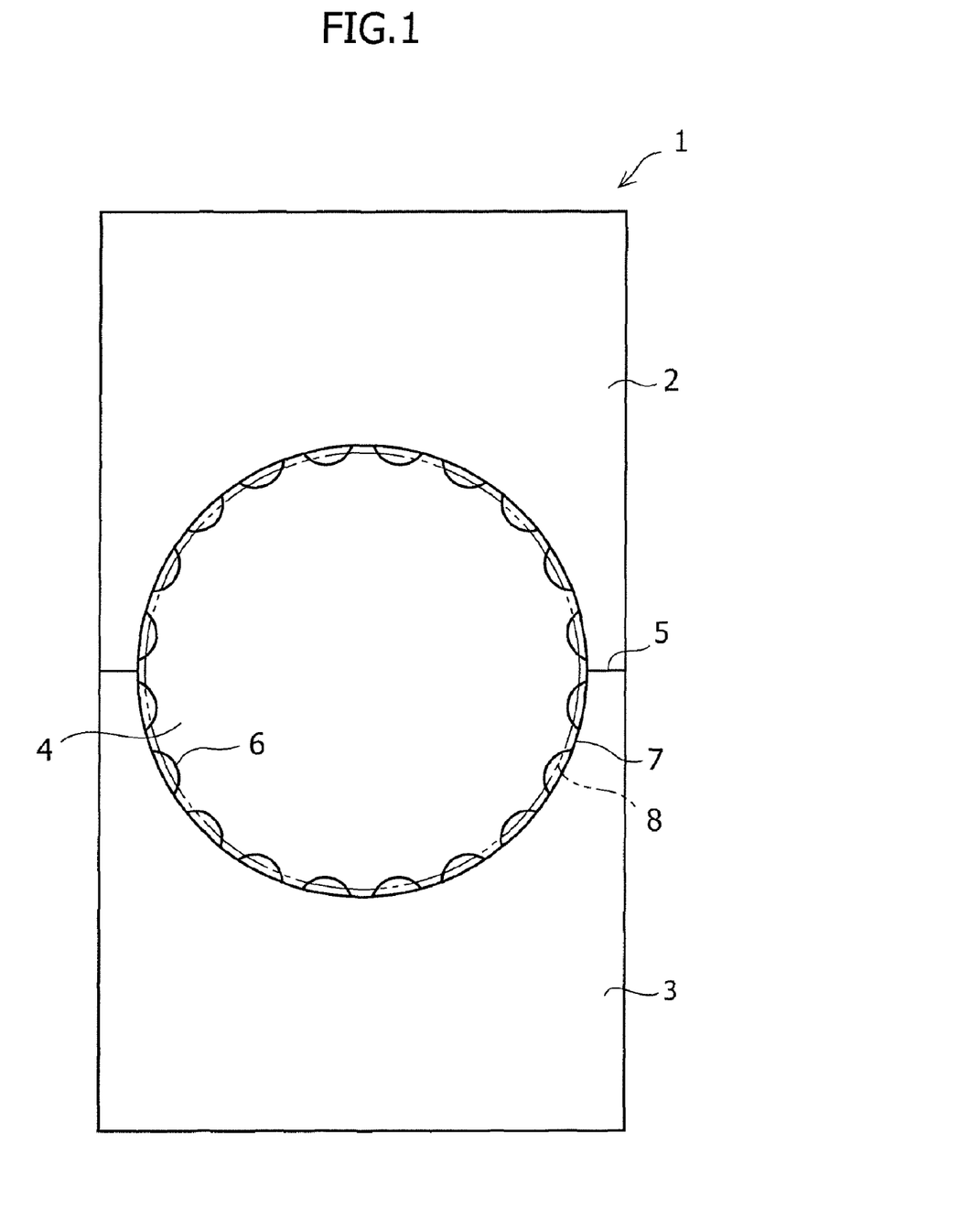
FIG. 1 is a cross-sectional view showing a first embodiment of a mold for forming a golf ball according to the present invention.

When manufacturing a golf ball by injection molding, an injection molding mold 1 shown, for example, in FIG. 1, is used. This injection molding mold 1 includes a body part 2 of a metallic upper mold and a body part 3 of a metallic lower mold. By separatably joining the body parts 2 and 3 of the upper and lower molds, an internal cavity 4 and a parting line 5 are formed. In the drawing, although as an aid to understanding, the runners, gates, support pins and vents and the like disposed in the area around the cavity have been omitted, the type, number, and disposition thereof may be treated as they have been conventionally.

As shown in FIG. 1, the body parts 2 and 3 of the mold 1 for forming a golf ball of one embodiment of the present invention have a cavity wall surface 7 and dimple-forming protrusions 6 for forming the dimples of the golf ball formed thereon. The cavity wall surface 7 between the plurality of dimple-forming protrusions 6 serves to form the spherically shaped land part of the golf ball that is formed. In this case, the cavity wall surface 7 of the molds 2 and 3 for forming a golf ball is positioned further to the outside of an imaginary spherical surface 8 of the golf ball, so that the land parts of the golf ball that will be ground are thicker by the amount of the ground area.

Figure 2:
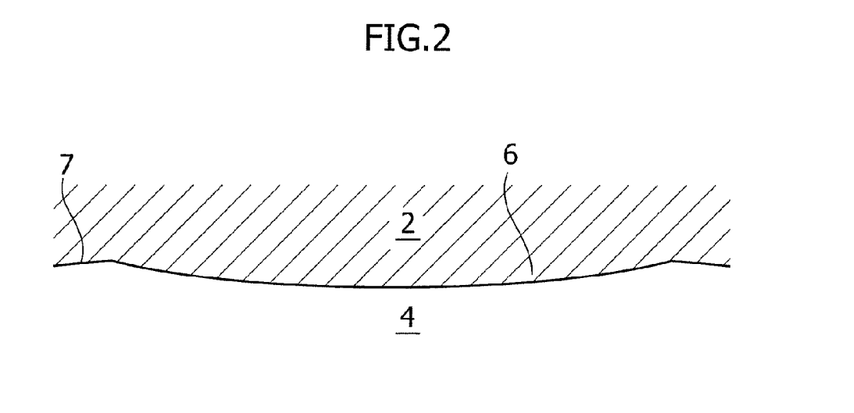
FIG. 2 is a magnified cross-sectional view of a dimple-forming protrusion of the mold shown in FIG. 1.
Figure 3:
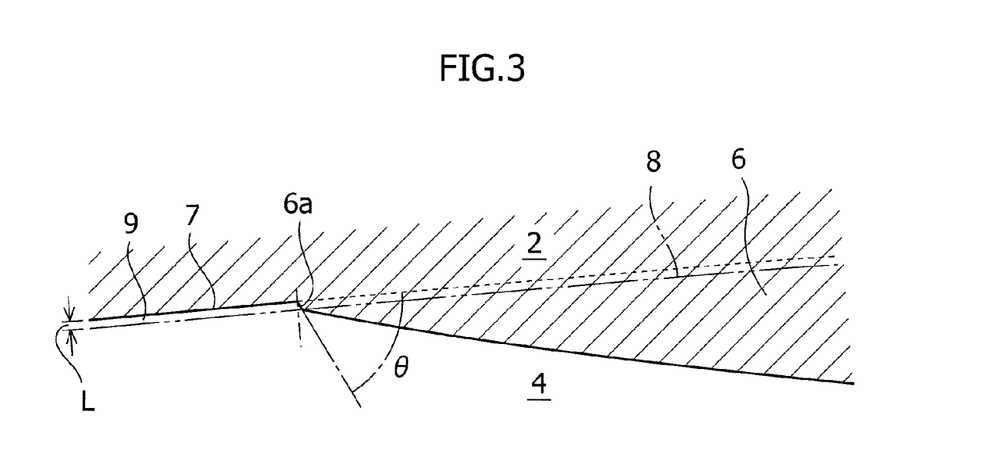
FIG. 3 is a further magnified cross-sectional view of a dimple-forming protrusion of the mold shown in FIG. 1.

FIG. 2 and FIG. 3 show in magnified form the dimple-forming protrusion 6 of the upper mold 2. Covering material of the golf ball is injected into the cavity 4 at the time of injection molding. The other dimple-forming protrusions of the upper mold 2 and lower mold 3 have the same structure.

As shown in FIG. 3, the expected ground area 9 in which the land part expected to be ground is within a region that is apart by L from the cavity surface 7. The distance L of this expected ground area 9 is made from about 3 μm to about 20 μm. The lower limit of the distance L is preferably about 6 μm, more preferably about 8 μm, and still more preferably about 10 μm. The upper limit is preferably about 17 μm, more preferably about 15 μm, and still more preferably about 13 μm. If the distance L is too short, variation is amount of grinding may cause grinding to exceed the expected grounding area, and if the distance is too long, the grinding will require excessive time, thereby reducing efficiency.

The edge part 6a of the dimple-forming protrusion positioned within the expected ground area 9, which is the connecting part between the cavity wall surface 7 and the dimple-forming protrusion 6 is connected at an angle θ with respect to the cavity wall surface 7. That is, the dimple-forming protrusion 6 in a region up to the distance L from the cavity wall surface 7 has an edge part 6a that is a surface at an angle θ with respect to the cavity wall surface 7. The angle θ is preferably from about 60° to about 90°, more preferably from about 80° to about 90° and still more preferably 90°. In this manner, by making the angle between the dimple-forming protrusion 6 and the cavity wall surface 7 be the angle θ, it is possible to make the influence on dimple size of variations in grinding very small. If this angle θ is too small, the difference in the dimple size between before and after grinding becomes large.

Figure 4A:
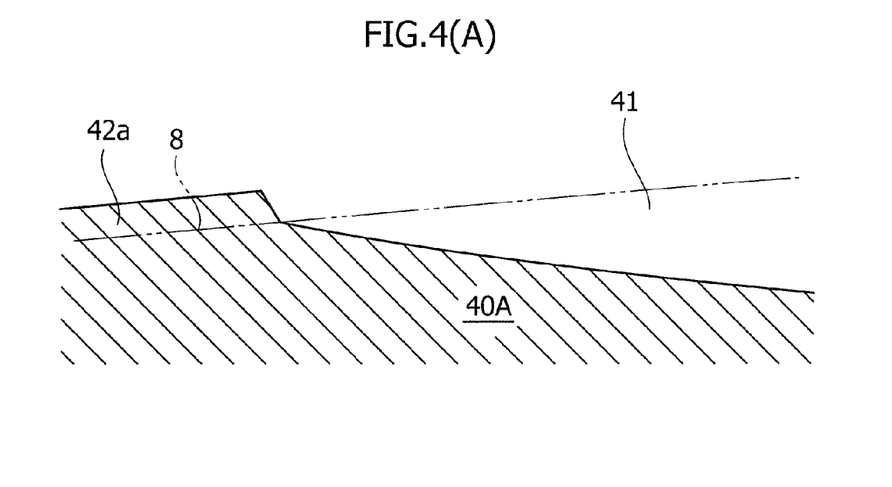
FIG. 4A is a magnified cross-sectional view of one end of a dimple of a golf ball formed by the mold for forming a golf ball according to one embodiment of the present invention.
Figure 4B:
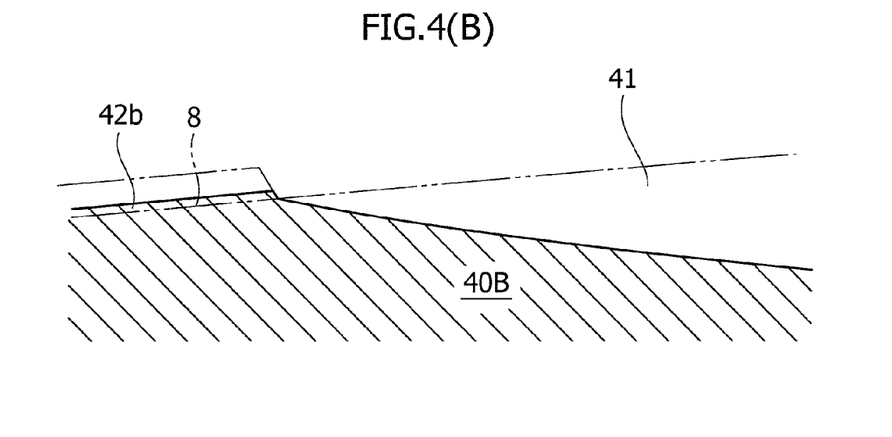
FIG. 4B is a cross-sectional view showing the condition of the dimple shown in FIG. 4A after spherical grinding.

FIG. 4A shows the connection between the dimple and the land part in a golf ball formed by the mold of the present invention. The golf ball 40A formed by the mold for forming of golf ball of the present invention has a dimple 41 and expected ground land part 42a on the surface thereof. In this manner, the golf ball that is injection molded has an expected ground land part 42a corresponding to the expected grind area 9 within the mold cavity on the surface thereof. Because the golf ball has pin burrs after molding, the burrs are removed by spherical grinding. FIG. 4B shows the golf ball shown in FIG. 4A after spherical grinding, the surface of this golf ball 40B having an expected ground land part 42b that is ground away by spherical grinding and a dimple 41. In FIG. 4B, the expected ground land part 42b that is ground away by grinding remains to a thickness that is greater than the imaginary spherical surface 8, this indicating the condition in which the land part is formed as is, although it is most preferable that the expected ground land part 42 be completely ground away by grinding, so that the imaginary spherical surface 8 and the land part coincide. Because the golf ball formed by the mold for forming a golf ball of the present invention has an expected ground land part 42 with the above-noted thickness and angle θ, even after spherical grinding it is possible to maintain the size and shape of the dimples, and also to reduce the influence of the amount of the grinding on the size and the shape of the dimple.

The amount of grinding in the process step of grinding the total spherical surface of the golf ball to remove pin burrs is preferably at least about 50% and up to 100% and more preferably about 60% to less than 100% of the expected ground land part 42a. If the amount of grinding is too small, offset from the design becomes large, and if the amount of grinding is too large, the dimples will be excessively ground away, making the size of the dimples small.

The manufacture of the mold for forming a golf ball according to the present invention may be performed by a widely known method of manufacturing of the past, for example, a method of directly machining in three dimensions using, for example, 3D CAD/CAM, wire-cut EDM, or discharge machining.

Although there is no particular restriction with regard to the type and shape of the large number of dimples formed in the surface of the golf ball, they are preferably circular or non-circular of either the same or different shapes, with a diameter of about 0.5 mm to about 6 mm, and a depth from about 0.05 mm to about 0.4 mm. The condition of arrangement of these dimples may be rotationally symmetric and form an arrangement pattern that is a regular icosahedron, a regular dodecahedron, or a regular octahedron or the like. The dimple-forming protrusions formed in the internal cavity 4 can be appropriately designed to suit the type and shape of such dimples.

In order to obtain sufficient aerodynamic characteristics, it is desirable that the dimple-occupied ratio of surface area of the golf ball occupied by the dimples be at least about 75%. The term "dimple-occupied ratio" in this case refers to the ratio (SR value) between the total surface area of the golf ball occupied by dimples to the amount of surface area of the spherical surface of the golf ball assumed not to have dimples. If the dimple-occupied ratio is below the above-noted numerical range, the trajectory may not achieve a good carry, and might not achieve a satisfactory distance.

In the case of forming a golf ball using a mold for forming a golf ball according to the present invention, there is no particular restriction with regard to the core, and it is possible to use various cores, for example, a single-layer solid core, a solid core having a plurality of vulcanized rubber layers, a solid core having a plurality of resin layers, or a wound core having a wound rubber string layer, or the like. Although in the present invention the cover is injection molded around the core using the mold for forming a golf ball according to the present invention, the material of the cover layer material may preferably be a known thermoplastic resin having an ionomer resin or urethane resin as the main component, or a thermoplastic elastomer. The cover is not restricted to a single layer, and may have a multilayer structure with two or more layers. The cover layer thickness (per layer) is appropriately selected depending upon the core diameter and number of cover layers, and is preferably from about 0.5 mm to about 3.0 mm.

Figure 5:
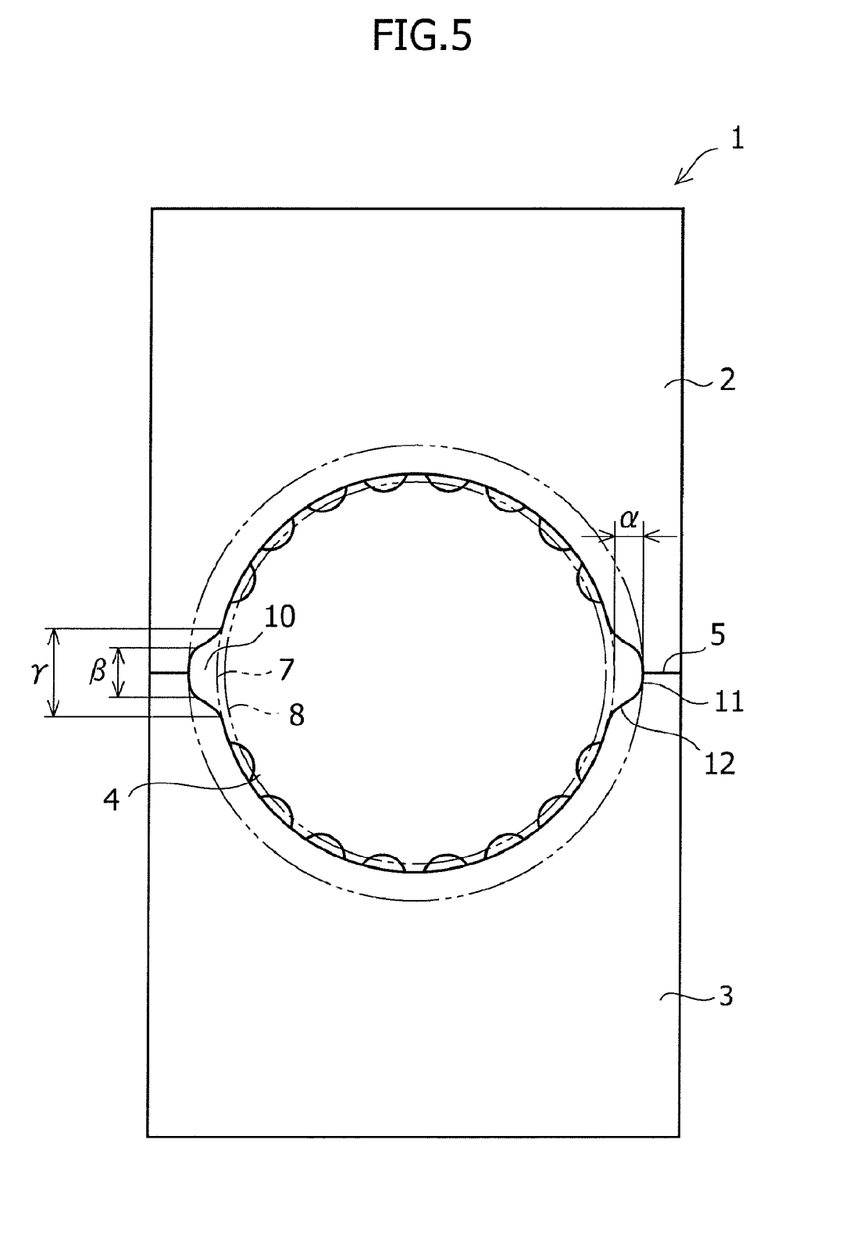
FIG. 5 is a cross-sectional view showing one embodiment of a mold for forming a golf ball according to the present invention, which shows a mold for forming a golf ball having a groove in the internal cavity wall surface adjacent to the entire circumference of the parting line formed by the joining.

In this manner, a golf ball formed by the mold of the present invention can properly maintain the size and shape of the dimples in the spherical grinding process. The mold for forming a golf ball according to the present invention may further have a constitution having a projecting land part for grinding in the region surrounding the parting line. For example, as shown in FIG. 5, it is possible to further provide a groove 10 in the cavity wall surface 7 neighboring the parting line 5 between the mold body parts that are the upper mold 2 and the upper mold 3. The groove 10 is a groove for the purpose of forming a projecting land part for grinding that projects further beyond the land of the golf ball after molding. The groove 10 is formed in both the upper mold part 2 and the lower mold part 3.

This land part for grinding that is formed on the equator of the golf ball after forming of the golf ball is designed to be higher than the expected ground land part 42a on the golf ball surface other than the area of the surface in proximity to the equator. For this reason, the groove 10 of the upper and lower mold parts 2 and 3 preferably has a depth of a from the cavity bottom surface. It is preferable that a be selected appropriately depending upon the grinding conditions, and it particularly preferable that the upper limit of a be about 100 μm, more preferably about 80 μm, and still more preferably about 60 μm. The lower limit of $\alpha$ is preferably about 5 μm and more preferably about 10 μm. If the upper limit is exceeded grinding requires time, and the resulting golf ball can be one with a low degree of sphericity. If the lower limit is exceeded, the dimple shape could be lost.

The connecting surface 12 between the groove bottom surface 11 and the cavity wall surface 7 of the body parts 2 and 3 preferably connects these two surface asymptotically. The term "connects asymptotically" in this case means that curves are connected smoothly to each other so as to approach an asymptotic line gradually. That is, the groove bottom surface 11 and the cavity wall surface 7 of the body parts 2 and 3 are connected to each other by the connecting surface 12 having a smoothly curved shape. As a result, the projecting land part for grinding of an injection molded golf ball is connected smoothly to the land part of the golf ball, so that when grinding is performed after injection molding, a change in the grinding force can be accommodated properly.

The groove bottom surface 11, as shown in FIG. 5, preferably has a width 13 such that a preferred projecting land part for grinding is formed. The width 13 of the groove bottom surface 11 is preferably changed appropriately depending on the grinding conditions. The upper limit of the width 13 is preferably about 10 mm, is more preferably about 8 mm, and is still more preferably about 7 mm. Also, the lower limit of the width 13 is preferably about 0.2 mm, and is more preferably about 0.4 mm.

Also, the groove 10, as shown in FIG. 5, preferably has a width $\gamma$ such that a preferred projecting land part for grinding is formed. The width $\gamma$ of the groove 10 is preferably changed appropriately depending on the grinding conditions. The upper limit of the width $\gamma$ is preferably about 10 mm, is more preferably about 8 mm, and is still more preferably about 7 mm. Also, the lower limit of the width $\gamma$ is preferably about 0.2 mm, and is more preferably about 0.4 mm, and is still more preferably about 1 mm.

If the width $\gamma$ of the groove 10 exceeds 5 mm, the grinding area becomes too large, so that the grinding process takes excessive time, and also the symmetry of a golf ball may be deteriorated. On the other hand, if the width $\gamma$ of the groove 10 is narrower than 0.1 mm, it is not possible to prevent deformation of the dimple shape due to grinding.

The groove bottom surface 11 of the body parts 2 and 3 is preferably of a shape having a spherical surface portion having the same center as the center of the imaginary spherical surface 8. By doing this, the projecting land part for grinding of an injection molded golf ball is shaped so as to have a spherical surface portion having the same center as the center of a spherical surface consisting of the land part of golf ball, so that uniform grinding can be performed.

Figure 6:
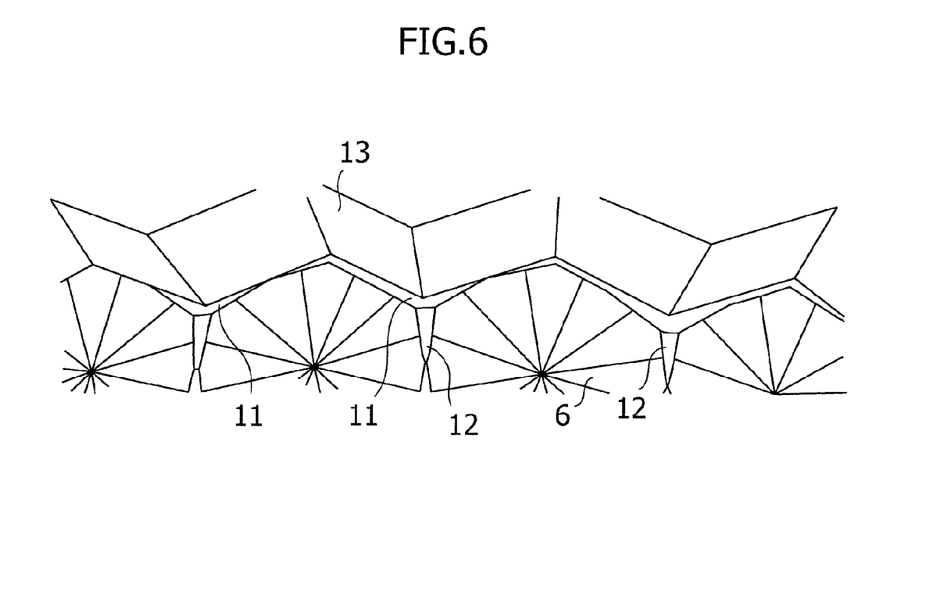
FIG. 6 is a perspective view showing a dimple-forming protrusion neighboring the joint surface and the cavity wall surface of the mold shown in FIG. 5.

FIG. 6 shows the parting line 5 and the cavity wall surface 7 in the body part 3 of the lower mold of the mold 1 having the groove 10 in the area adjacent to the entire circumference of the parting line 6. FIG. 6 shows by example protrusions 6 for forming noncircular dimples. It will be understood, of course, that the present invention can be applied to circular dimples. Also, FIG. 6 shows a case in which the parting line is a zigzag line. It will be understood, however, that the parting line can be made linear or wavy. As shown in FIG. 6, a joint surface 13 and the groove bottom surface 11 for forming the projecting land part for grinding are continuous with each other. The groove bottom surface 11 continues to the dimple-forming projection 6 for forming the dimple or the connecting surface 12. In the case in which the dimples are arranged so as to straddle the equator surface of golf ball, the dimple-forming protrusion is continuous with the joint surface 13 directly, without the groove bottom surface 11 being interposed.

Figure 7A:
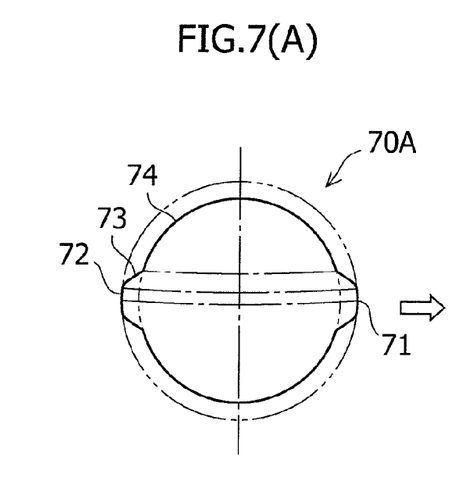
FIG. 7A is a side elevation showing the condition before parting line grinding of the golf ball formed by the mold for forming a golf ball having a groove formed in the internal cavity wall surface adjacent to the entire circumference of the parting line.
Figure 7B:
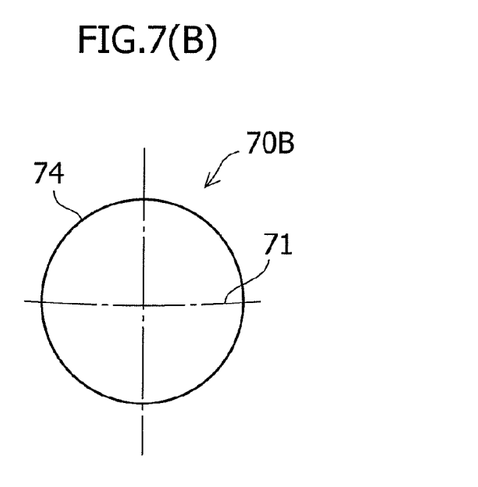
FIG. 7B is a side elevation showing the condition after parting line grinding of the golf ball formed by the mold for forming a golf ball having a groove formed in the internal cavity wall surface adjacent to the entire circumference of the parting line.

FIG. 7 shows a golf ball manufactured using a mold 1 having such groove 10 for forming a golf ball in accordance with one embodiment of the present invention. FIG. 7A is a side elevation of the golf ball which is formed using a mold 1 for forming a golf ball in accordance with the embodiment of the present invention before grinding. As shown in FIG. 7A, a golf ball 70A injection molded using the mold 1 for forming a golf ball in accordance with the embodiment of the present invention has a projecting land part 72 for grinding around an equator 71 thereof. For ease of understanding, the illustration of dimples is omitted, the surface of the golf ball is taken as the land part 74, and the land part 74 is equivalent to the expected ground land part 42a of the golf ball. The projecting land part for grinding 72 and the golf ball land part 74 are connected by the connecting land part 73. The connecting land part 73 preferably has a shape that is smoothly continuous with the land part 74. FIG. 7B is a side elevation showing the condition after parting line grinding of the injection molded golf ball shown in FIG. 7A. For the golf ball injection molded using the mold 1 for forming a golf ball in accordance with the present invention, the projecting land part 72 for grinding on the equator 71 is removed by grinding for removing burrs and the like, thereby manufacturing a spherical golf ball 70B.

Figure 8:
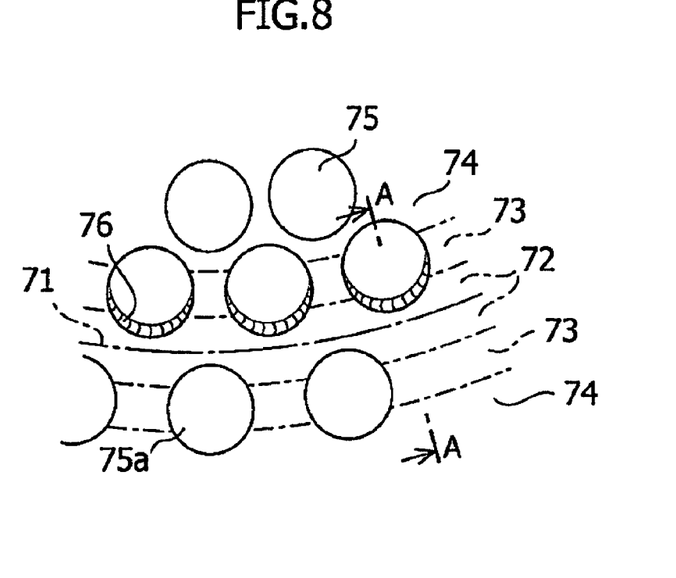
FIG. 8 is a perspective view showing the equatorial region of a golf ball formed by injection molding using the mold for forming a golf ball having a groove formed in the internal cavity wall surface adjacent to the entire circumference of the parting line.

FIG. 8 shows the relationship between the projecting land part 72 for grinding and dimples 75. Many dimples 75 are formed in the surface of golf ball. The projecting land part 72 for grinding is formed around the equator 71 of the golf ball. Dimples 75a adjacent to the equator 71 each have a predetermined depth from the land part, similar to other dimples 75. At the edge adjoining the projecting land part 72 for grinding of the dimple 75a, therefore, a cliff 76 corresponding to the height a of the projecting land part 72 for grinding is formed. The projecting land part 72 for grinding is continuous with the land part 74 via the connecting land part 73.

Figure 9A:
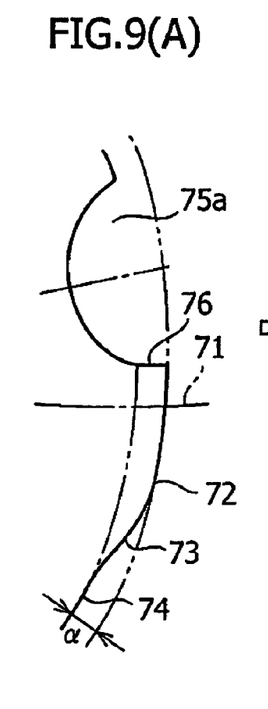
FIG. 9A is a side elevation showing, before parting line grinding, a part of the equatorial surface of a golf ball formed by the mold for forming a golf ball having a groove formed in the internal cavity wall surface adjacent to the entire circumference of the parting line.
Figure 9B:
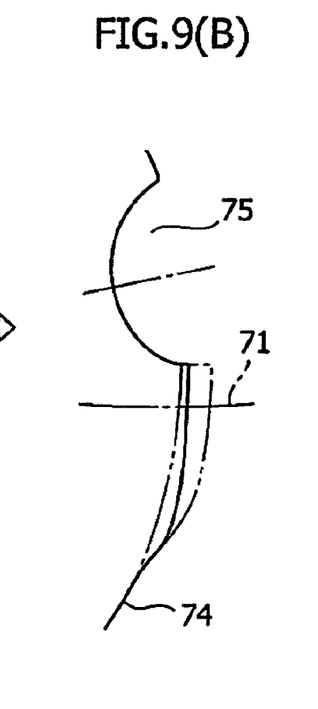
FIG. 9B is a side elevation showing, after parting line grinding, a part of the equatorial surface of a golf ball formed by the mold for forming a golf ball having a groove formed in the internal cavity wall surface adjacent to the entire circumference of the parting line.

FIG. 9 shows cross-sectional views taken along the line A-A of FIG. 8. FIG. 9A is an equator surface side view of the golf ball formed using the mold 1 before grinding. As shown in FIG. 9A, adjacent to the equator 71 of the formed golf ball, the projecting land part 72 for grinding having a width in the direction of upper and lower poles excluding the region of the dimple 75 is formed. The projecting land part 72 for grinding is continuous with the land part 74 via the connecting land part 73. Also, the projecting land part 72 for grinding has the height of a with respect to the land part 74. FIG. 9B shows the condition after grinding of the formed golf ball shown in FIG. 9A. As shown in FIG. 9B, the projecting land part 72 for grinding having been formed adjacent to the equator 71 of golf ball is ground away by grinding. However, because grinding is not performed exceeding the height a of the projecting land part 72 for grinding, a dimple 75 existing adjacent to the equator 71 does not lose its shape. Also, even if the ground away height varies somewhat depending on the grinding force, the ball surface after grinding can maintain a spherical shape because the connecting land part 73 connects smoothly with the land part 74. On the other hand, in the case of grinding a golf ball that is injection-molded in a conventional mold, the vicinity of the equator 71 is more excessively removed than other areas, the result being that the shape of dimples in the vicinity of the golf ball equator differ from the proper shape.

In this manner, after grinding to remove burrs in the vicinity of the parting line having a projecting land part for grinding 72, it is possible to perform spherical grinding for the purpose of removing pin burrs over the golf ball surface having an expected ground land part. By having land parts for the purpose of maintaining the shape of dimple-forming protrusions that accommodate two grindings, these being parting line grinding and spherical grinding, it is possible to eliminate wasteful grinding at each step, and to perform grinding with good efficiency.

Although the foregoing describes a specific embodiment of a mold for forming a golf ball according to the present invention, the present invention is not restricted to such an embodiment and, as will be understood by one skilled in the art, may be subjected to various modifications and corrections within the scope of the art of the present invention.

DESCRIPTION OF THE REFERENCE NUMERALS

1 Mold for molding a golf ball
2 Upper mold
3 Lower mold
4 Internal cavity
5 Parting line
6 Dimple-forming protrusion
7 Cavity wall surface
8 Imaginary spherical surface
9 Expected ground area
10 Groove
11 Groove bottom surface
12 Connecting surface
13 Joint surface
40A Golf ball after injection molding
40B Golf ball after spherical grinding
41 Dimple
42a Expected ground land part before spherical grinding
42b Expected ground land part after spherical grinding
70A Golf ball after injection molding
70B Golf ball after parting line grinding
71 Equator
72 Projecting land for grinding
73 Connecting land part
74 Land
75 Dimple
76 Cliff

What is claimed is:

1. A mold for forming a golf ball, comprising at least two body parts, a cavity being formed within the mold by the joining of the at least two body parts,
    wherein the body part comprises a cavity wall surface having a spherical surface shape with the center thereof being at the center of the cavity and dimple-forming protrusions provided on the cavity wall surface,
    the dimple-forming protrusions being connected to the cavity wall surface at an angle of about 60 or more degrees in a region from about 3 μm to about 20 μm from the cavity wall surface;
    wherein at least one body part further has a groove in the cavity wall surface adjacent to the whole circumference of a parting line formed by the joining for the purpose of forming a protruding land part that will be ground after molding of the ball.

2. The mold for forming a golf ball according to claim 1, wherein the angle is at least about 80 or more degrees.

3. The mold for forming a golf ball according to claim 1, wherein the angle is perpendicular.

4. The mold for forming a golf ball according to claim 1, wherein the region is a region from about 6 μm to about 15 μm from the cavity wall surface.

5. The mold for forming a golf ball according to claim 1, wherein the groove has a depth from about 5 μm to about 100 μm from the cavity wall surface.

6. The mold for forming a golf ball according to claim 1, wherein a bottom surface of the groove and the cavity wall surface are connected to each other asymptotically.

7. The mold for forming a golf ball according to claim 1, wherein a width of the groove is within about 10 μm.

8. The mold for forming a golf ball according to claim 1, wherein a bottom surface of the groove includes a spherical surface part having a center that is the same as a center of the spherical surface shape of the cavity wall surface.

9. A method for manufacturing a golf ball, comprising:
 a step of forming a golf ball using a mold according to claim 1; and
 a step of grinding a surface of the golf ball.

10. A method for manufacturing a golf ball according to claim 9, wherein the golf ball formed by the mold has an expected ground land part on a surface of the golf ball, and wherein in the grinding step at least about 50% of the thickness of the expected ground land part is ground away.

11. An unground golf ball manufactured using the following process:
 providing the mold according to claim 1; and
 forming a golf ball using the mold.

* * * * *